(12) United States Patent
Moore

(10) Patent No.: US 8,118,326 B2
(45) Date of Patent: Feb. 21, 2012

(54) TOOLLESS QUICK DETACH WEIGHT SYSTEM

(75) Inventor: Nickolas T. Moore, Beatrice, NE (US)

(73) Assignee: Husqvarna Professional Products, Inc., Charlotte, NC (US)

( * ) Notice: Subject to any disclaimer, the term of this patent is extended or adjusted under 35 U.S.C. 154(b) by 72 days.

(21) Appl. No.: 12/834,232

(22) Filed: Jul. 12, 2010

(65) Prior Publication Data

US 2012/0007349 A1   Jan. 12, 2012

(51) Int. Cl.
*B60S 9/00* (2006.01)

(52) U.S. Cl. .......................................... 280/759

(58) Field of Classification Search ............... 414/673, 414/719; 280/758, 759; 212/195, 196
See application file for complete search history.

(56) References Cited

U.S. PATENT DOCUMENTS

| | | | | |
|---|---|---|---|---|
| 3,135,404 | A * | 6/1964 | Pilch | 414/719 |
| 3,492,019 | A | 1/1970 | Folkerts | |
| 3,709,520 | A * | 1/1973 | Johnson et al. | 280/759 |
| 3,888,507 | A * | 6/1975 | Berghausen | 280/759 |
| 4,094,534 | A * | 6/1978 | Welke et al. | 280/760 |
| 4,232,883 | A * | 11/1980 | Bourgeous et al. | 280/759 |
| 4,377,300 | A | 3/1983 | Old | |
| 4,537,423 | A | 8/1985 | Nau et al. | |
| 6,533,319 | B1 * | 3/2003 | Denby et al. | 280/759 |

FOREIGN PATENT DOCUMENTS

| | | |
|---|---|---|
| DE | 2423400 | 11/1975 |
| FR | 2561607 | 9/1985 |
| GB | 1505108 | 3/1978 |
| GB | 2000735 | 1/1979 |
| JP | 52163803 | 12/1977 |
| JP | 10028421 | 2/1998 |
| JP | 10059224 | 3/1998 |
| JP | 2007112233 | 5/2007 |

* cited by examiner

*Primary Examiner* — Paul N Dickson
*Assistant Examiner* — Robert A Coker
(74) *Attorney, Agent, or Firm* — Nelson Mullins Riley & Scarborough LLP

(57) ABSTRACT

Coupling systems and methods enable adjustable utilization of counterweights and other components on vehicles, such as riding lawn mowers. A mounting bracket and pivoting locking plate are operable to releasably secure a component, such as a counterweight, to a vehicle without the use of tools. Responsive to insertion of the component into the mounting bracket, the locking plate pivots to secure the mounting bracket to the vehicle.

21 Claims, 11 Drawing Sheets

TOOLLESS QUICK DETACH WEIGHT SYSTEM

TECHNICAL FIELD

The present disclosure relates to weight distribution, and in particular, to systems and methods for adjustable weight distribution, for example in vehicles.

BACKGROUND

Vehicles (e.g., outdoor power equipment such as lawn mowers and lawn tractors) are often configured with adjustable weight distribution systems. The systems are typically included in order to, for example, provide increased traction in wet or inclined conditions, offset weight in a different part of the vehicle, and/or the like.

However, prior weight distribution systems have been unable to overcome various difficulties. For example, certain prior weight distribution systems have required various tools for installation and/or modification. Other prior weight distribution systems have been excessively expensive and/or excessively complex. Yet other weight distribution systems have been undesirably large and/or interfered with the vision of an operator of a vehicle. As such, a long-felt need exists for an adjustable weight distribution system.

SUMMARY

This disclosure relates to systems and methods for weight distribution, for example weight distribution on outdoor power equipment. In an exemplary embodiment, a counterweight system for a riding lawn mower comprises a counterweight, and a mounting bracket configured with a first trench and a second trench. The first trench is configured to receive a portion of the riding lawn mower, and the second trench is configured to receive a portion of the counterweight. The counterweight system further comprises a locking plate pivotable with respect to the mounting bracket. At least a portion of the locking plate is disposed within the second trench. Responsive to insertion of at least a portion of the counterweight into the second trench, the locking plate pivots to extend at least partially into the first trench and releasably couples the mounting bracket to the riding lawn mower.

In another exemplary embodiment, a coupling system comprises a locking plate configured with a flange, and a mounting bracket comprising a cavity having a front wall and a back wall. The cavity is configured to accommodate at least a portion of the locking plate between the front wall and the back wall. The coupling system further comprises a pivot arm coupled to the mounting bracket. The pivot arm is configured to allow the locking plate to pivot about the pivot arm. Responsive to insertion of at least a portion of a coupled object into the cavity between the locking plate and the back wall, the locking plate pivots in a first direction about the pivot arm to releasably couple the mounting bracket to a target object.

In another exemplary embodiment, a method for coupling a coupled object to a target object comprises placing a mounting bracket into contact with the target object. The mounting bracket comprises a trench having a front wall and a back wall, and the trench is configured to accommodate at least a portion of a locking plate between the front wall and the back wall. The locking plate is configured with a flange. The method further comprises inserting at least a portion of the coupled object into the trench to cause the locking plate to pivot in a first direction about a pivot arm and releasably couple the mounting bracket to the target object.

The contents of this summary section are provided only as a simplified introduction to the disclosure, and are not intended to be used to limit the scope of the appended claims.

BRIEF DESCRIPTION OF THE DRAWINGS

With reference to the following description, appended claims, and accompanying drawings:

DETAILED DESCRIPTION

Figure 1:
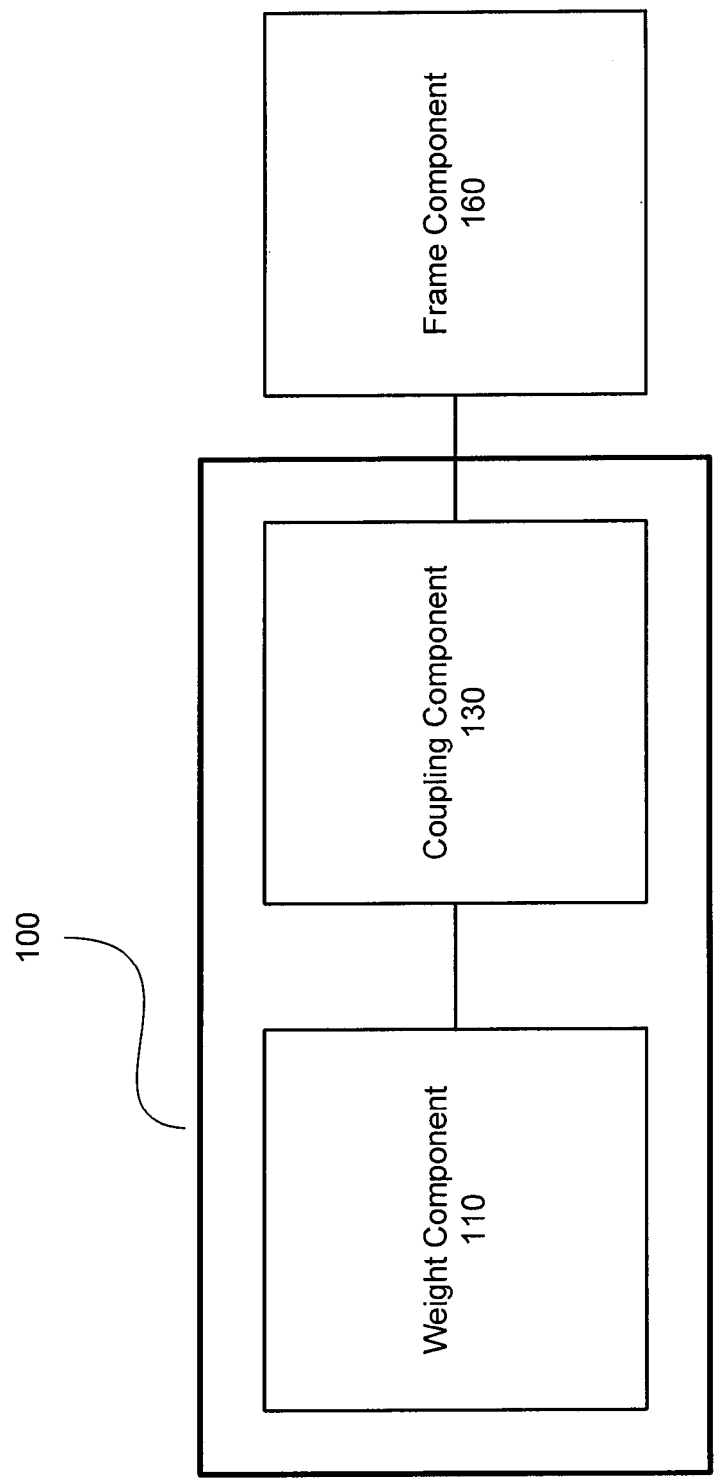
FIG. 1 illustrates a block diagram of an exemplary weight distribution system in accordance with an exemplary embodiment.

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments, without departing from the scope of the appended claims. For example, the steps recited in any of the method or process descriptions may be executed in any order and are not necessarily limited to the order presented. Moreover, many of the manufacturing functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. As used herein, the terms "coupled," "coupling," or any other variation thereof, are intended to cover a physical connection, an electrical connection, a magnetic connection, an optical connection, a communicative connection, a functional connection, and/or any other connection.

For the sake of brevity, conventional techniques for mechanical system construction, management, operation, measurement, optimization, and/or control, may not be described in detail herein. Furthermore, the connecting lines shown in various figures contained herein are intended to represent exemplary functional relationships and/or physical couplings between various elements. It should be noted that many alternative or additional functional relationships or physical connections may be present in a practical adjustable weight distribution system.

Principles of the present disclosure reduce and/or eliminate problems with prior weight distribution systems. For example, various weight distribution systems configured in accordance with principles of the present disclosure are able to be installed, uninstalled, and/or adjusted by hand, without the need for (or with minimal) tools. Other weight distribution systems configured in accordance with principles of the present disclosure are mountable to a vehicle in various locations, for example in order to reduce interference with the vision on a vehicle operator. Yet other weight distribution systems configured in accordance with principles of the present disclosure are manufacturable at a reduced expense as compared to certain prior weight distribution systems, for example by eliminating or reducing various mounting hardware, fasteners and/or other components.

In various exemplary embodiments, a riding lawn mower is configured with a weight distribution system. As used herein, a "weight distribution system" may generally include components capable of increasing and/or decreasing the weight of a vehicle at a particular location, for example in order to modify the center of gravity of the vehicle, compensate for weight added or removed elsewhere on the vehicle, and/or the like.

With reference to FIG. 1A, weight distribution system 100 may comprise weight component 110 and coupling component 130. Weight component 110 may comprise metal (e.g., lead, iron, and/or the like) and/or other components, structures, and/or materials configured with suitable characteristics such as density. Coupling component 130 may comprise various housings, brackets, flanges, fasteners, and/or the like, and/or any other materials and/or structures configured to detachably couple weight component 110 to a vehicle, for example to frame component 160. Moreover, weight distribution system 100 may be configured with any suitable components, for example various housings, couplings, weights, and/or the like, configured to modify the weight of a vehicle at a particular location.

Figure 2A:
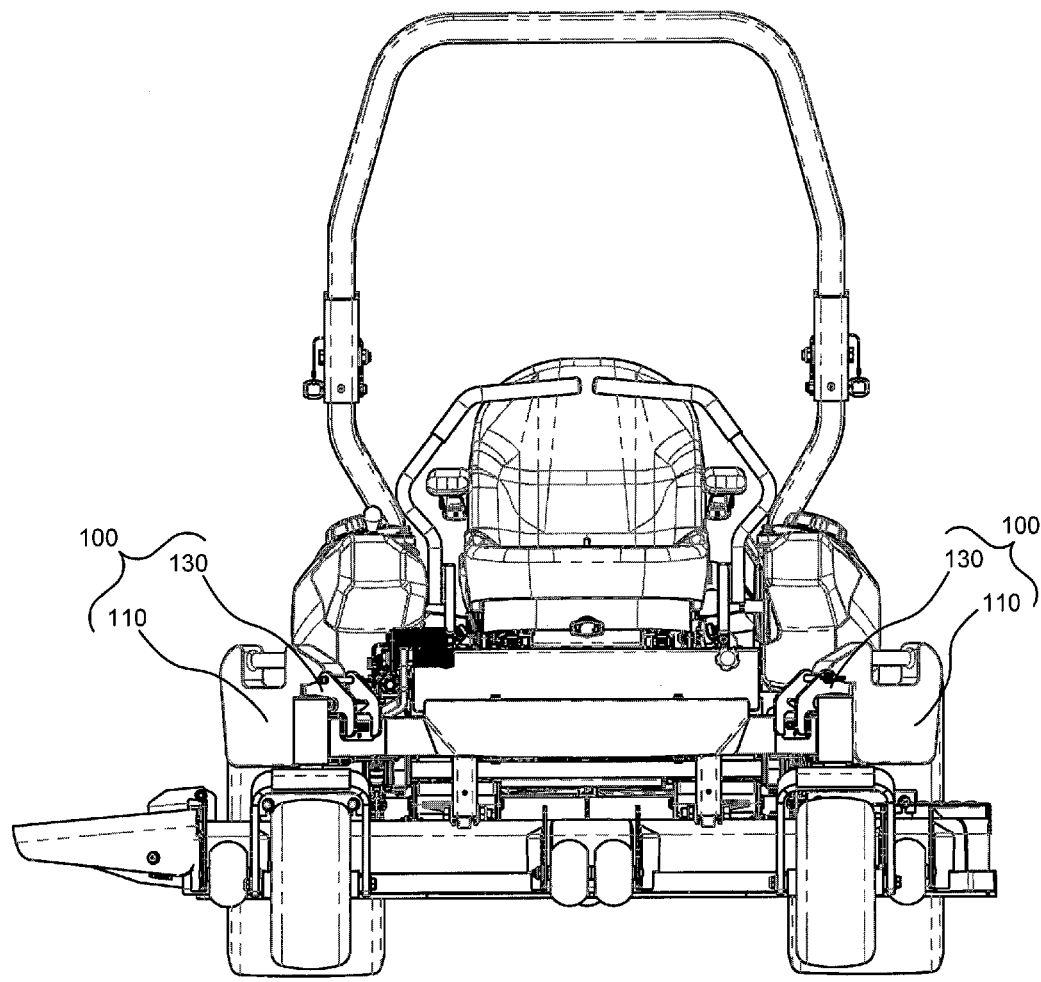
FIGS. 2A and 2B illustrate an exemplary outboard mounted weight distribution system utilized in connection with a riding lawn mower in accordance with an exemplary embodiment.
Figure 2B:
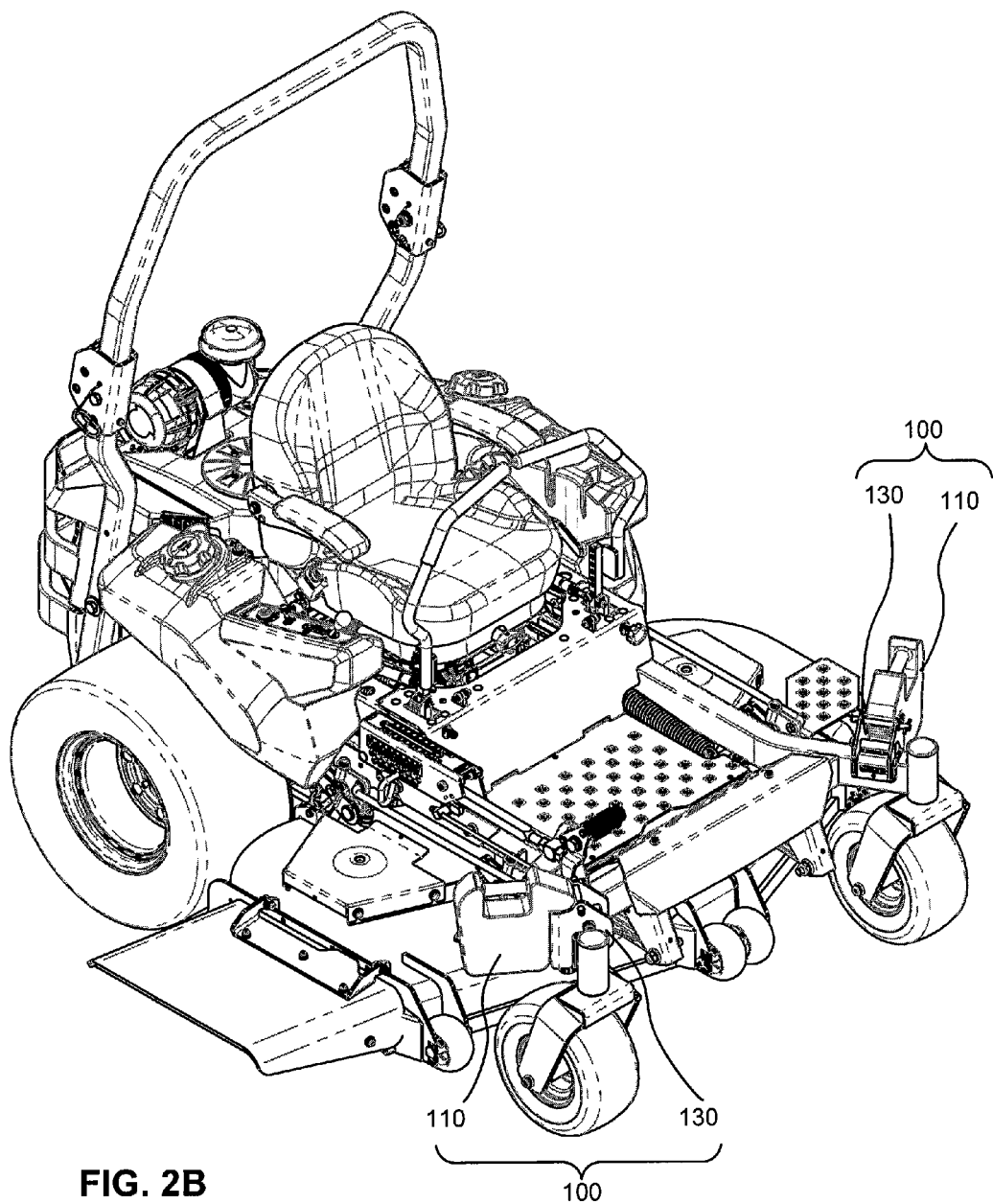

With reference now to FIGS. 2A and 2B, in various exemplary embodiments, weight distribution system 100 (i.e., weight component 110 and coupling component 130) may be coupled to a riding lawn mower. In certain exemplary embodiments, weight distribution system 100 may be coupled to the riding lawn mower in an "outboard" configuration, wherein weight distribution system 100 extends from a mounting location on the riding lawn mower substantially outward toward the edge of the riding lawn mower. In this configuration, weight distribution system 100 facilitates improved operator visibility in the generally forward direction from the seat of the riding lawn mower. Such a configuration may be desirable, for example, when the operator is utilizing the riding lawn mower to mow long straight paths.

Figure 2C:
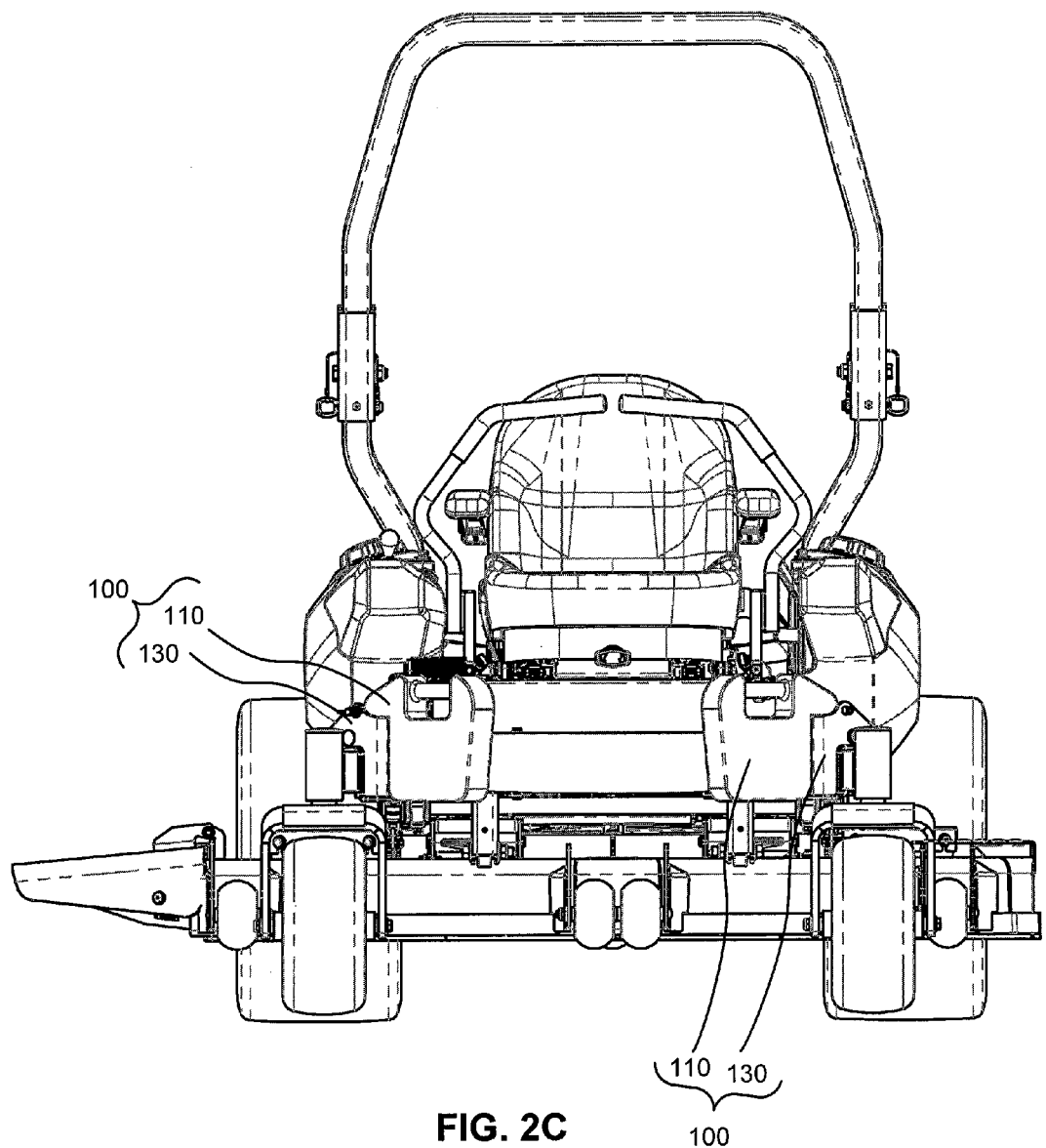
FIGS. 2C and 2D illustrate an exemplary inboard mounted weight distribution system utilized in connection with a riding lawn mower in accordance with an exemplary embodiment.
Figure 2D:
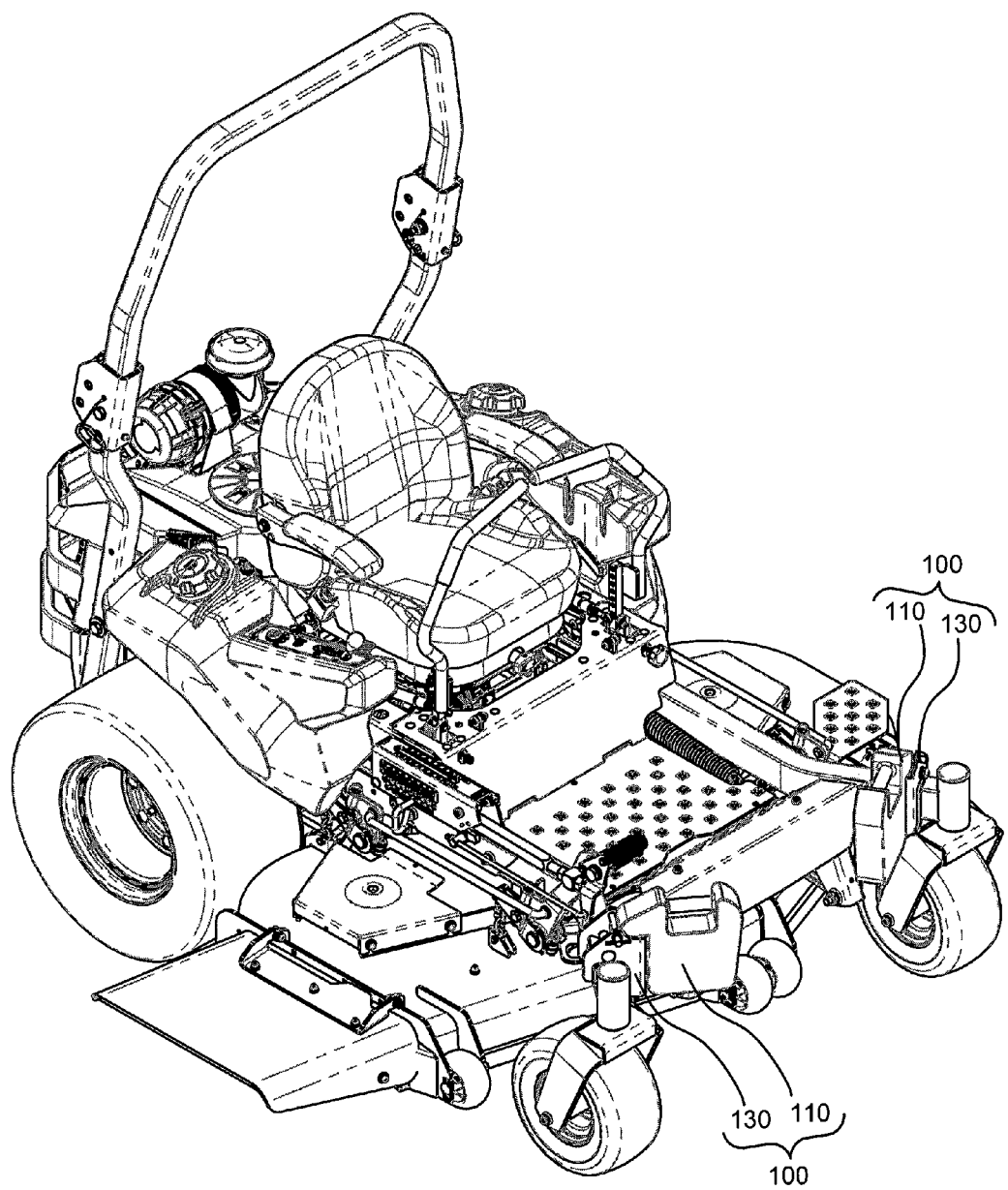

Turning now to FIGS. 2C and 2D, in exemplary embodiments, weight distribution system 100 may be coupled to the riding lawn mower in an "inboard" configuration, wherein weight distribution system 100 extends from a mounting location on the riding lawn mower substantially inward toward a centerline of the riding lawn mower. In this configuration, weight distribution system 100 facilitates improved operator visibility to the side of the riding lawn mower. Such a configuration may be desirable, for example, when the operator is mowing around obstacles, when smaller cutting decks (e.g., cutting decks having a total width of less than about twice the frame width) are installed on the riding lawn mower, and/or the like. In one example, an "inboard" configuration may be desirable when the total cutting deck width of a riding lawn mower is less than about 38 inches and the frame width of the riding lawn mower is less than about 19 inches.

Turning now to FIGS. 3A-3D, in an exemplary embodiment, weight component 110 comprises counterweight 312. Counterweight 312 is configured with trench 313 configured to admit a portion of mounting bracket 332. Moreover, counterweight 312 may comprise various weights, housings, extensions, trenches, geometries, and/or the like, for example in order to facilitate coupling to mounting bracket 332. Counterweight 312 may be coupled to and decoupled from mounting bracket 332 in order to add and/or remove weight from a vehicle.

Coupling component 130 may comprise mounting bracket 332, flanged locking plate 334 configured with flange 335 having tube 339 coupled thereto, bolt 338, nut 340, and ball detent retention pin 342. Coupling component 130 couples weight component 110 to a desired location.

In an exemplary embodiment, mounting bracket 332 comprises components configured to facilitate coupling of counterweight 312 to a desired location, for example a location on frame tube 362 of a vehicle. Mounting bracket 332 may comprise steel, aluminum, plastic, and/or any other suitable structural material and/or combinations of the same. Mounting bracket 332 may be monolithic. In an embodiment, mounting bracket 332 may comprise multiple components coupled together. Moreover, mounting bracket 332 may be cast, pressed, sintered, die-cut, machined, stamped, bonded, laminated, polished, smoothed, bent, rolled, molded, plated, coated, and/or otherwise shaped and/or formed via any suitable method and/or apparatus. Mounting bracket 332 may be configured with one or more surfaces approximating the dimensions of a portion of frame tube 362 where counterweight 312 is desired to be coupled. For example, mounting bracket 332 may be configured with a first cavity, such as trench 333 configured to receive a portion of rectangular frame tube 362 and contact frame tube 362 on three sides. Mounting bracket 332 may also be configured with a second cavity, for example a trench configured to admit a portion of counterweight 312.

Figure 3A:
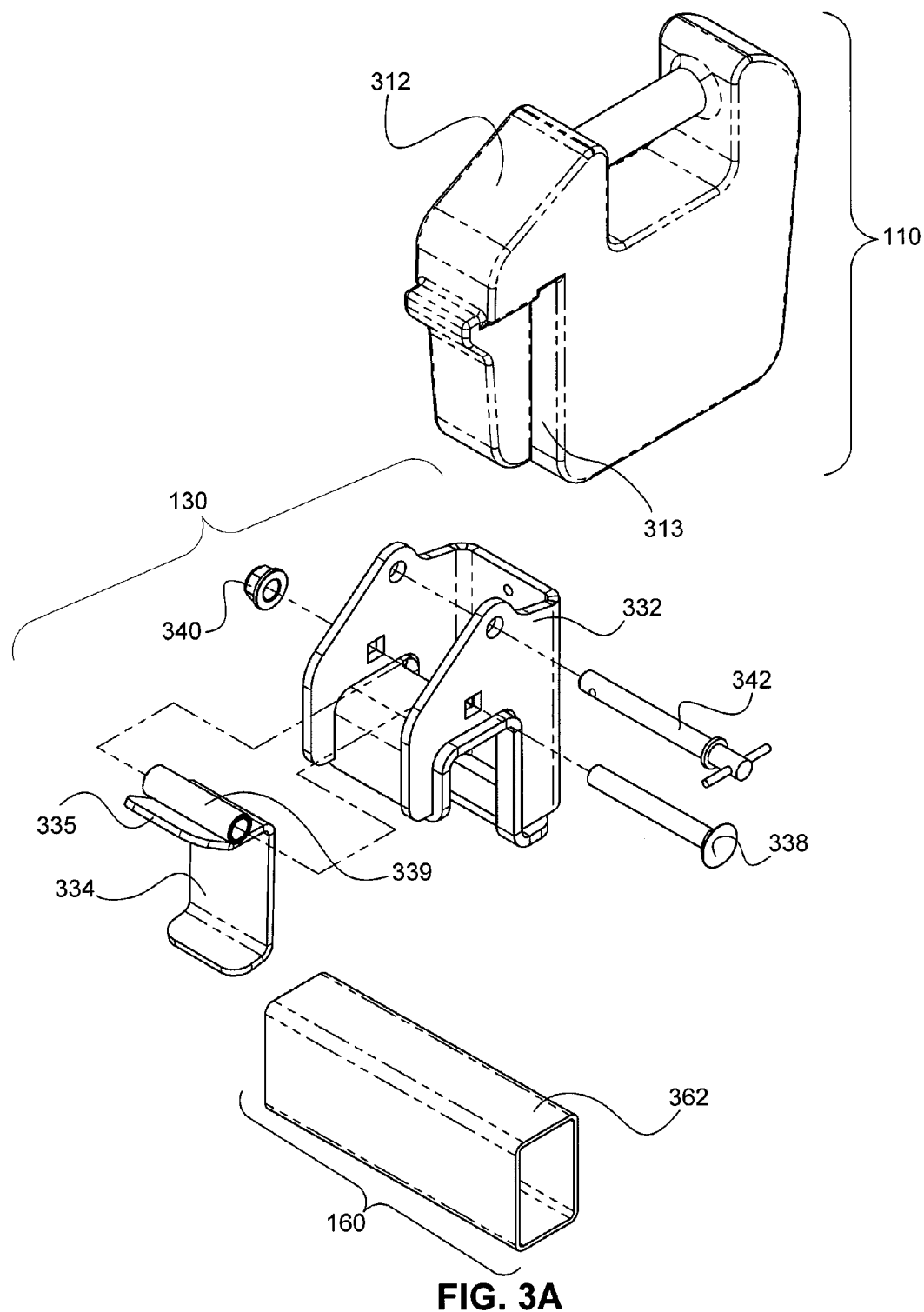
FIGS. 3A-3D illustrate components of an exemplary weight distribution system and operation of an exemplary weight distribution system in accordance with an exemplary embodiment.
Figure 3B:
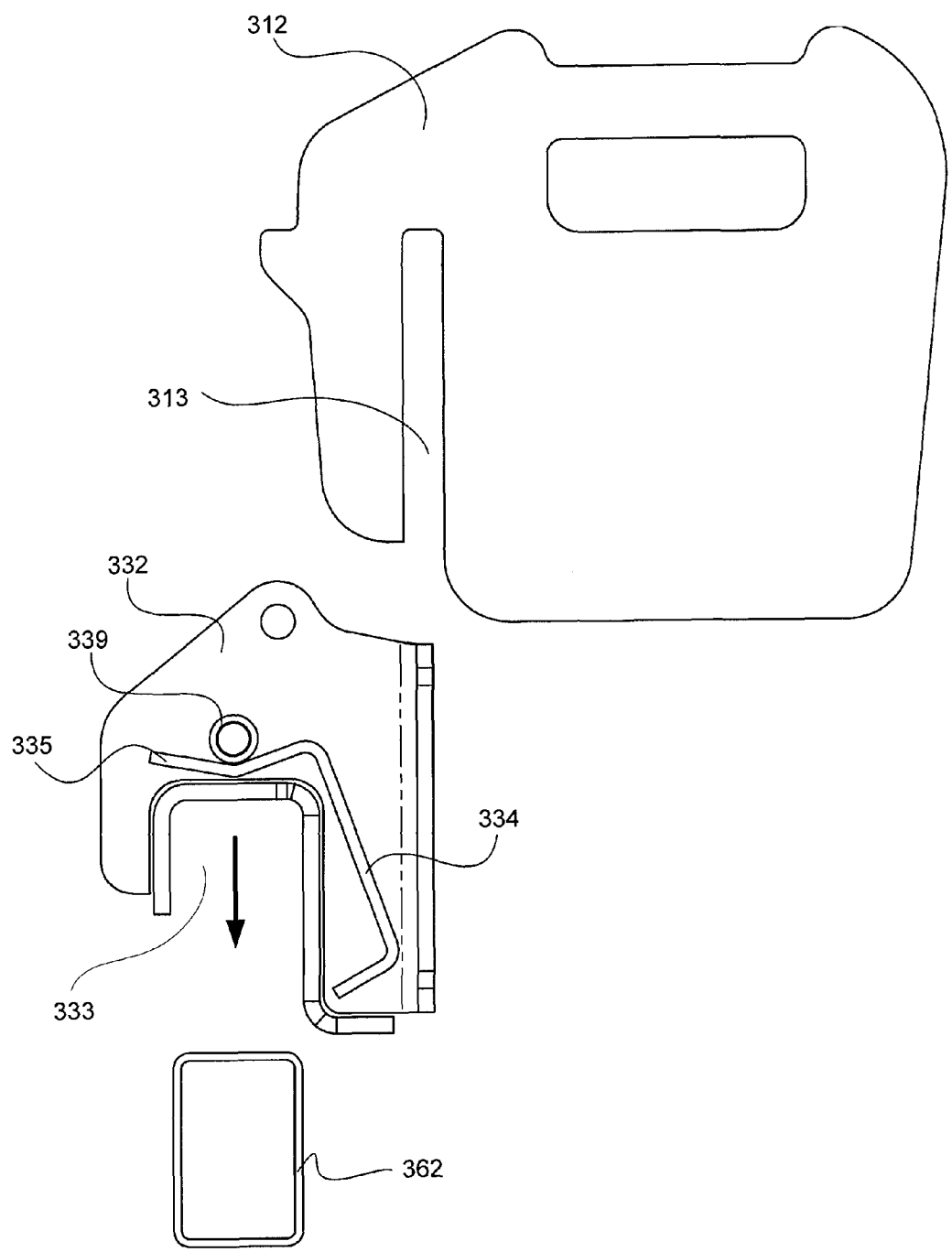
Figure 3C:
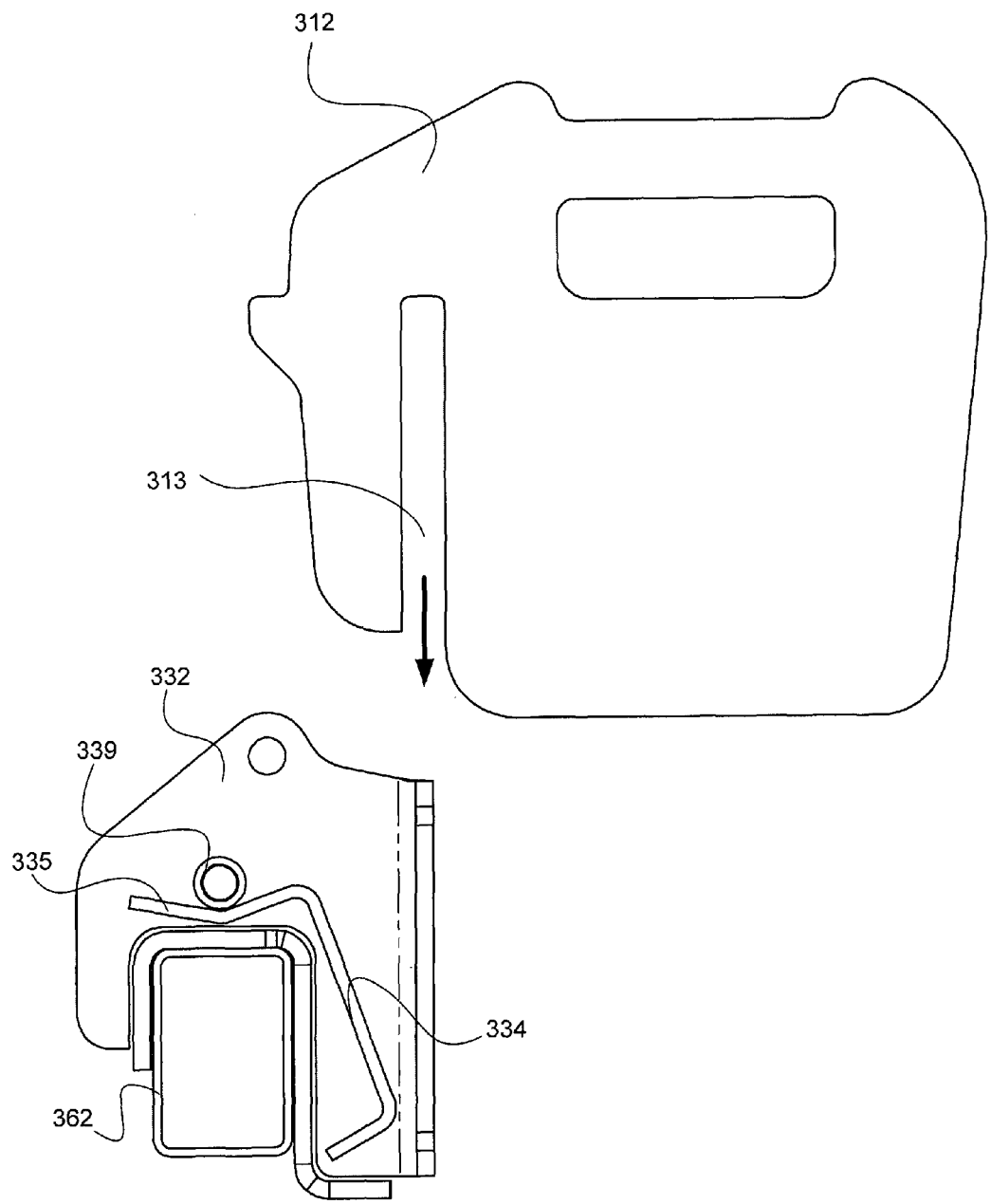
Figure 3D:
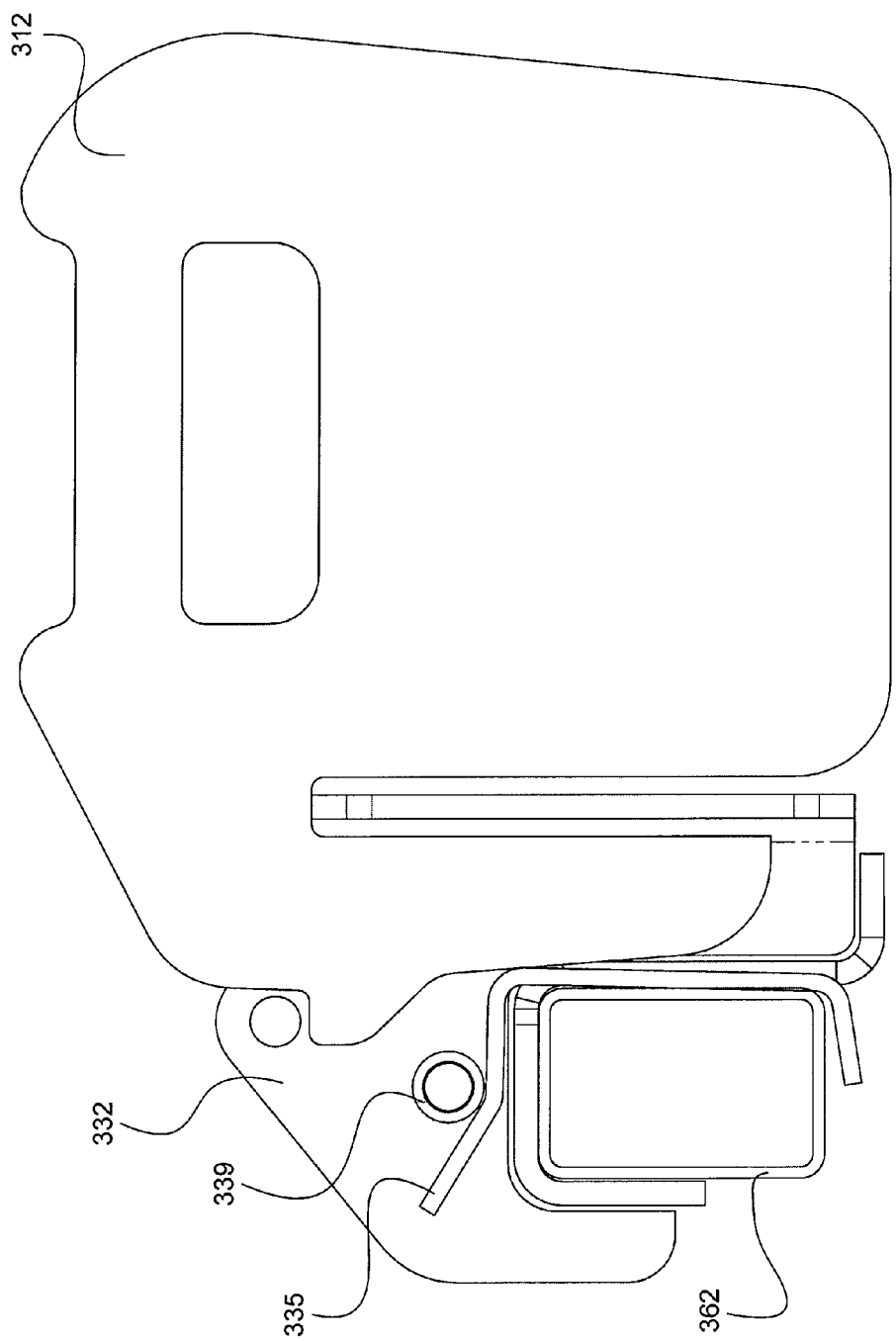

With continued reference to FIGS. 3A-3D, and with particular reference to FIG. 3A, mounting bracket 332 may be coupled to various components in order to provide the ability of flanged locking plate 334 to pivot with respect to mounting bracket 332. In an exemplary embodiment, bolt 338 and nut 340 are coupled to mounting bracket 332 in order to provide a pivot point for flanged locking plate 334 and/or couple flanged locking plate 334 to mounting bracket 332, for example by bolt 338 passing through tube 339. In other exemplary embodiments, mounting bracket 332 may be configured with integrated components (e.g., flanges, bars, extensions, knobs, and/or other suitable protrusions) about which flanged locking plate 334 may pivot, as desired.

In an exemplary embodiment, flanged locking plate 334 is configured to releasably engage frame component 160 responsive to rotation of flanged locking plate 334, for example rotation of flanged locking plate 334 about a pivot provided by tube 339 rotating about bolt 338. Flanged locking plate 334 may be configured with one or more surfaces approximating the dimensions of a portion of frame tube 362 where counterweight 312 is desired to be coupled, including a surface approximating the dimensions of a portion of frame tube 362 not approximated by a surface of mounting bracket 332 (for example, the "top" side of trench 333). Stated another way, mounting bracket 332 and flanged locking plate 334 are configured to contact frame tube 362 on at least one different side and/or surface of frame tube 362. Thus, flanged locking plate 334 and mounting bracket 332, in combination, may at least partially surround frame tube 362 on multiple sides, for example at least partially on all four sides of a frame tube 362 having a substantially rectangular cross-section. In this manner, flanged locking plate 334 cooperates with mounting bracket 332 to releasably couple mounting bracket 332 to frame tube 362.

In various exemplary embodiments, flanged locking plate 334 is configured with flange 335. Flange 335 is coupled to tube 339, for example by welding, in order to allow flanged locking plate 334 to pivot about bolt 338. In an exemplary embodiment, tube 339 is welded to flange 335. In other exemplary embodiments, tube 339 is welded to flanged locking plate 334 in other locations. Additionally, flange 335 may be configured with various suitable dimensions, extensions, and angles, for example in order to allow a force to be applied to flange 335 to cause flanged locking plate 334 to pivot about bolt 338 in a particular direction (for example, a direction substantially opposite the direction flanged locking plate pivots responsive to insertion of counterweight 312 into mounting bracket 332). In one example, flange 335 is sized and/or angled such that flange 335 may be depressed by a human hand.

In various exemplary embodiments, mounting bracket 332 is configured to couple with ball detent retention pin 342. Ball detent retention pin 342 may comprise any suitable components and/or mechanisms configured to retain counterweight 312 in contact with mounting bracket 332. Ball detent retention pin 342 may further comprise various components configured to facilitate use, for example flanges to assist a user in inserting and/or removing ball detent retention pin 342. Moreover, in various exemplary embodiments, counterweight 312 may be at least partially retained in contact with mounting bracket 332 via a clevis pin and hair pin, a bolt and wing nut, a rubber strap, and/or any other suitable retention apparatus and/or system.

Frame component 160 may comprise frame tube 362. Frame tube 362 may be rectangular, oval, circular, and/or any other suitable shape configured to facilitate connecting with coupling component 130. Frame tube 362 may comprise one or more of steel, aluminum, titanium, iron, and/or other suitable metals and/or alloys thereof, and/or other suitable structural materials and/or components. Frame tube 362 may form part of a vehicle, for example a riding lawn mower, lawn tractor, or other outdoor power equipment, a truck, a tractor, and/or any other suitable vehicle.

In an exemplary embodiment, with reference now to FIGS. 3B-3D and 4A, weight distribution system 100 may be utilized to secure a weight to a particular location on a vehicle, as follows:

Mounting bracket 332 is placed over frame tube 362 (step 410). Counterweight 312 may be positioned in the top opening of mounting bracket 332 and a portion of counterweight 312 may be inserted into trench 313 (step 420). Responsive to counterweight 312 engaging mounting bracket 332 via trench 313, flanged locking plate 334 is forced against the side of frame tube 362 (step 430). This creates a positive lock between mounting bracket 332 and flanged locking plate 334. Once counterweight 312 is engaged, ball detent retention pin 342 may be installed (step 440), for example in order to prevent counterweight 312 from bouncing and/or vibrating out of mounting bracket 332.

Figure 4A:
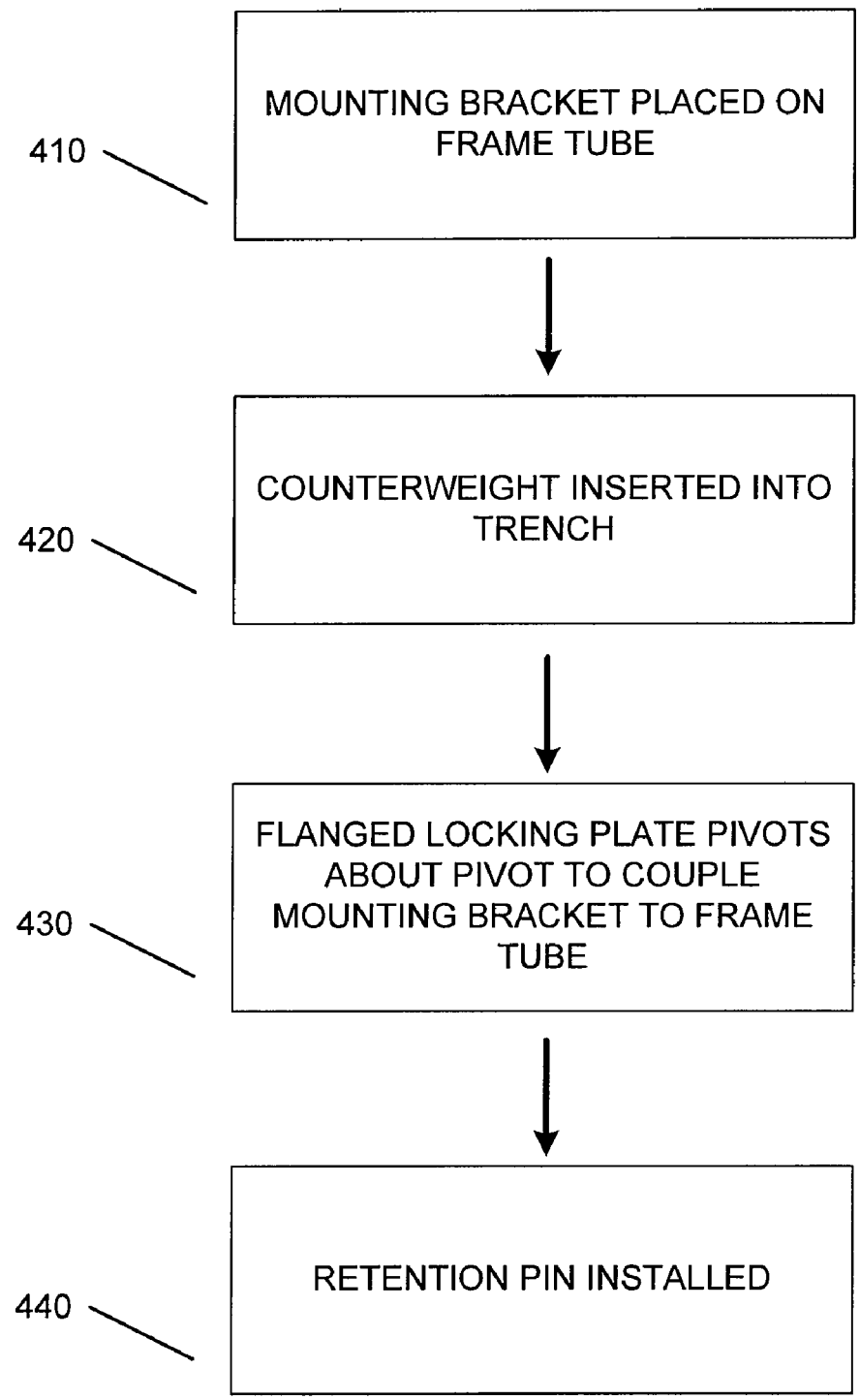
FIGS. 4A and 4B illustrate block diagrams of exemplary methods of using an exemplary weight distribution system in accordance with an exemplary embodiment.
Figure 4B:
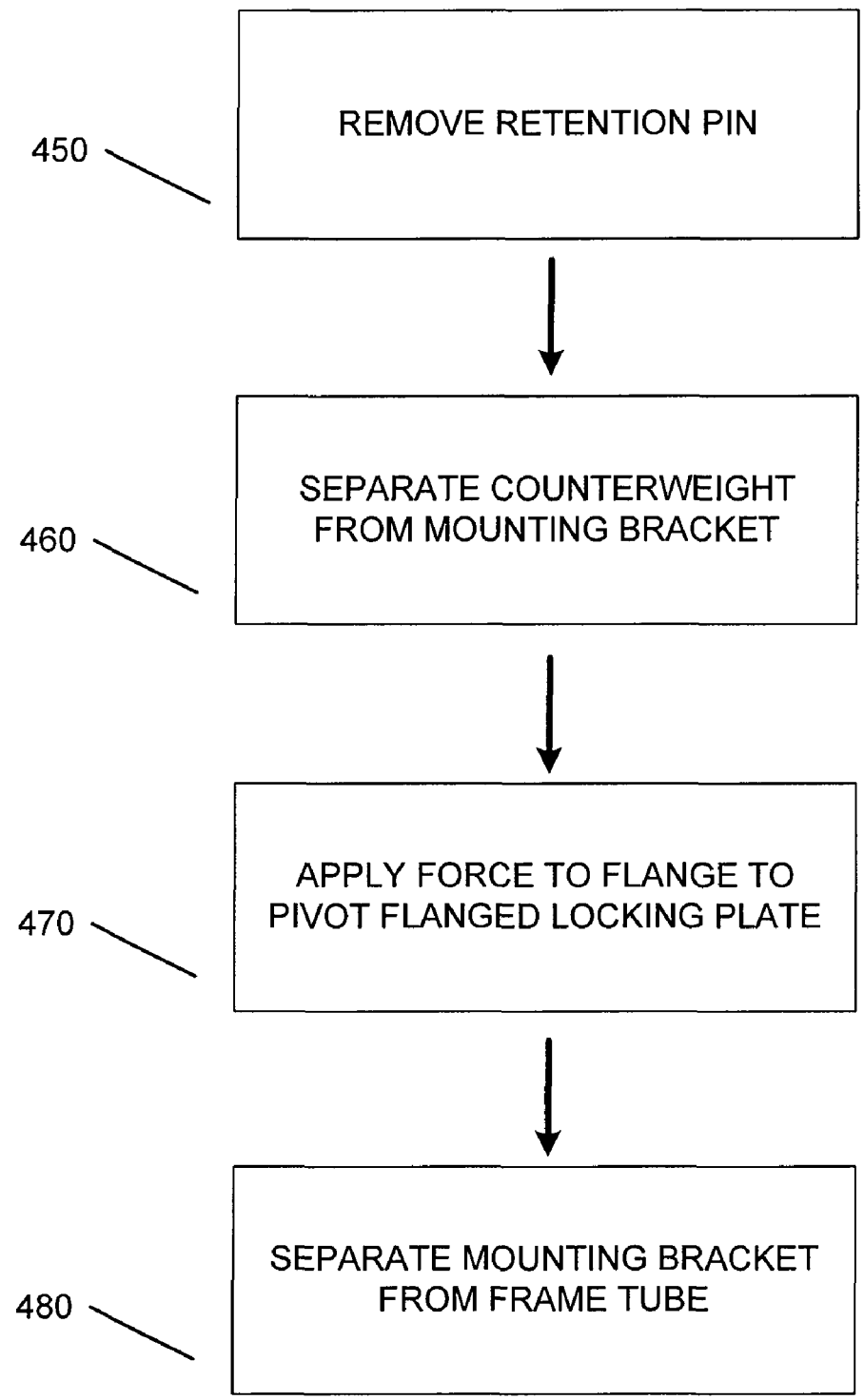

Weight distribution system 100 may be removable and/or repositionable, as desired. In an exemplary embodiment, with reference now to FIG. 4B, weight distribution system 100 may be removed from a particular location on a vehicle as follows:

Ball detent retention pin 342 is pulled from mounting bracket 332 (step 450). Counterweight 312 may then be lifted to remove it from engagement with mounting bracket 332 (step 460). After counterweight 312 is removed, pressure may be applied to flange 335 of flanged locking plate 334, allowing flanged locking plate 334 to pivot about bolt 338 and at least partially away from frame tube 362 (step 470). While pressure is kept on flange 335, mounting bracket 332 may be lifted away from frame tube 362 (step 480). In this manner, weight distribution system 100 may be removed from a first location on a vehicle (for example, a generally frontal position) and/or relocated to a second location on a vehicle (for example, a position above the rear axle). Moreover, weight distribution system 100 may be entirely removed from the vehicle, as desired, for example in order to allow unimpeded operator visibility.

In various prior weight distribution systems, installing, adjusting, and/or uninstalling a counterweight and/or coupling components therefore typically required the use of time-consuming tools. In contrast, in various exemplary embodiments, weight distribution system 100 may be configured to be rapidly installed, relocated, and/or uninstalled on a vehicle, for example a riding lawn mower. In one exemplary embodiment, weight distribution system 100 may be separated from a riding lawn mower in less than 30 seconds, and without tools.

In certain exemplary embodiments, weight distribution system 100 may be employed to compensate for weight accruing in a collection system of a riding lawn mower. For example, as the riding lawn mower operates, cut grass and other debris may accumulate in a collection area, such as a rear-mounted bag. As the weight of the debris increases, the increased weight in the rear of the riding lawn mower may have adverse affects on steering, cutting performance, and/or the like, for example by making the front end feel "light" and/or increasing the tendency of the front wheels to bounce off the ground responsive to rough terrain. To compensate, weight distribution system 100 may be utilized toward the front of the riding lawn mower in order to reduce, minimize, and/or eliminate such undesirable effects.

In other exemplary embodiments, weight distribution system 100 may be utilized to increase traction for a riding lawn mower. For example, in wet and/or slippery conditions, increased weight above the drive axle may be desirable in order to more forcefully engage the tires and the ground. Thus, weight distribution system 100 may be utilized in an area above the drive axle in order to provide additional weight in that area.

In yet other exemplary embodiments, principles of the present disclosure may be utilized to couple components other than counterweights to a vehicle. For example, accessories such as collection hoppers, snow plows, mirrors, and/or the like may be coupled to a vehicle via mounting brackets, locking plates, and/or the like in accordance with principles of the present disclosure.

While principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure and may be expressed in the following claims.

The present disclosure has been described with reference to various embodiments. However, one of ordinary skill in the art appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. When language similar to "at least one of A, B, or C" or "at least one of A, B, and C" is used in the claims or specification, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

What is claimed is:

1. A counterweight system for a riding lawn mower, comprising:
   a counterweight;
   a mounting bracket configured with a first trench and a second trench, wherein the first trench is configured to receive a portion of the riding lawn mower, and wherein the second trench is configured to receive a portion of the counterweight; and
   a locking plate pivotable with respect to the mounting bracket, wherein at least a portion of the locking plate is disposed within the second trench,
   wherein, responsive to insertion of at least a portion of the counterweight into the second trench, the locking plate pivots to extend at least partially into the first trench and releasably couples the mounting bracket to the riding lawn mower.

2. The counterweight system of claim 1, wherein the first trench engages the riding lawn mower on three sides.

3. The counterweight system of claim 2, wherein, responsive to pivoting of the locking plate, the locking plate engages the riding lawn mower on a fourth side different from the three sides.

4. The counterweight system of claim 1, wherein the counterweight system is configured to couple to the riding lawn mower in at least two different configurations at the same location on the riding lawn mower.

5. The counterweight system of claim 4, wherein one of the different configurations is an inboard configuration, and wherein another one of the different configurations is an outboard configuration.

6. The counterweight system of claim 1, further comprising a pin configured to retain the counterweight in the second trench.

7. The counterweight system of claim 1, wherein the locking plate further comprises a flange configured to cause, responsive to a force applied to the flange, the locking plate to pivot out of the first trench.

8. The counterweight system of claim 1, wherein the counterweight system is installable to and removable from the riding lawn mower without the use of tools.

9. A coupling system, comprising:
   a locking plate configured with a flange;
   a mounting bracket comprising a cavity having a front wall and a back wall, the cavity configured to accommodate at least a portion of the locking plate between the front wall and the back wall; and
   a pivot arm coupled to the mounting bracket, the pivot arm configured to allow the locking plate to pivot about the pivot arm;
   wherein, responsive to insertion of at least a portion of a coupled object into the cavity between the locking plate and the back wall, the locking plate pivots in a first direction about the pivot arm to releasably couple the mounting bracket to a target object.

10. The coupling system of claim 9, wherein the locking plate presses against the target object responsive to the weight of the coupled object.

11. The coupling system of claim 9, wherein, responsive to insertion of at least a portion of the coupled object, the cavity engages the coupled object on three sides.

12. The coupling system of claim 11, wherein, responsive to pivoting of the locking plate, the locking plate engages the coupled object on a fourth side different from the three sides.

13. The coupling system of claim 9, wherein the flange is configured to cause, responsive to a force applied to the flange, the locking plate to pivot in a second direction opposite the first direction.

14. The coupling system of claim 9, further comprising a pin configured to retain the coupled object in the cavity of the mounting bracket.

15. A method for coupling a coupled object to a target object, the method comprising:
   placing a mounting bracket into contact with the target object, wherein the mounting bracket comprises a trench having a front wall and a back wall, the trench configured to accommodate at least a portion of a locking plate between the front wall and the back wall, the locking plate configured with a flange; and
   inserting at least a portion of the coupled object into the trench to cause the locking plate to pivot in a first direction about a pivot arm and releasably couple the mounting bracket to the target object.

16. The method of claim 15, wherein the mounting bracket contacts the target object on three sides.

17. The method of claim 16, wherein, responsive to the pivoting of the locking plate in the first direction, the locking plate contacts the target object on a fourth side different from the three sides.

18. The method of claim 17, wherein the portion of the target object adjacent the mounting bracket is substantially rectangular in cross-section.

19. The method of claim 15, further comprising:
   removing the portion of the coupled object in the trench of the mounting bracket; and
   pressing the flange to cause the locking plate to pivot in a second direction about the pivot arm and decouple the mounting bracket from the target object.

20. The method of claim 15, wherein the steps of the method are carried out by hand.

21. The method of claim 15, wherein the steps of the method are carried out without the use of tools.

* * * * *